United States Patent
Phan et al.

(10) Patent No.: US 9,911,273 B2
(45) Date of Patent: Mar. 6, 2018

(54) FACILITATING ACCESS TO A TARGET DEVICE

(71) Applicants: Kenny Phan, Irvine, CA (US); George Samaha, Laval (CA)

(72) Inventors: Kenny Phan, Irvine, CA (US); George Samaha, Laval (CA)

(73) Assignees: Kenny Phan, Irvine, CA (US); George Samaha, Laval (CA)

( * ) Notice: Subject to any disclaimer, the term of this patent is extended or adjusted under 35 U.S.C. 154(b) by 160 days.

(21) Appl. No.: 14/818,858

(22) Filed: Aug. 5, 2015

(65) Prior Publication Data

US 2016/0042602 A1     Feb. 11, 2016

Related U.S. Application Data

(60) Provisional application No. 62/033,803, filed on Aug. 6, 2014.

(51) Int. Cl.
    *G07F 17/32*      (2006.01)
    *H04L 29/06*      (2006.01)

(52) U.S. Cl.
    CPC .......... *G07F 17/3237* (2013.01); *H04L 63/10* (2013.01); *H04L 63/0492* (2013.01)

(58) Field of Classification Search
None
See application file for complete search history.

(56) References Cited

U.S. PATENT DOCUMENTS

| | | | |
|---|---|---|---|
| 8,613,648 B2 | 12/2013 | Aoki et al. | |
| 2010/0012715 A1* | 1/2010 | Williams | ............... G06Q 20/32 235/375 |
| 2012/0187187 A1* | 7/2012 | Duff | ................... G06Q 20/3276 235/382 |

(Continued)

FOREIGN PATENT DOCUMENTS

| | | |
|---|---|---|
| EP | 1791098 A2 | 5/2007 |
| EP | 2775462 A2 | 9/2013 |

(Continued)

OTHER PUBLICATIONS

Mateus Pelegrino et al., "Creating and Designing customized and dynamic game interfaces using smartphones and touchscreen", http://www.sbgames.org/, 2014, p. 819-826.

(Continued)

*Primary Examiner* — Sunit Pandya
(74) *Attorney, Agent, or Firm* — Mark D. Spiller

(57) ABSTRACT

The disclosed embodiments disclose techniques for facilitating access to a target device. During operation, a target device presents a unique code to a user device that is located in proximity to the target device. The user device presents this unique code to a management server that is associated with the target device to gain access to the target device, with the management server linking the two devices. The target device receives notification that the user device has been linked and displays a set of received user account information on a display. Subsequently, the target device receives notification from the management server that the linked user device has applied a credit to the target device, and initiates an operation that is associated with consuming the credit.

20 Claims, 9 Drawing Sheets

(56) References Cited

U.S. PATENT DOCUMENTS

| | | | |
|---|---|---|---|
| 2013/0065666 A1 | 3/2013 | Schueller et al. | |
| 2013/0065668 A1* | 3/2013 | LeMay | G07F 17/3223 463/25 |
| 2013/0137509 A1* | 5/2013 | Weber | G07F 17/3209 463/29 |
| 2014/0018154 A1 | 1/2014 | Petersen et al. | |
| 2014/0018155 A1 | 1/2014 | Nelson et al. | |
| 2014/0045586 A1* | 2/2014 | Allen | G07F 17/3288 463/25 |
| 2014/0094272 A1 | 4/2014 | Kelly et al. | |
| 2014/0162768 A1* | 6/2014 | Nelson | G07F 17/32 463/25 |
| 2014/0256407 A1 | 9/2014 | Graf et al. | |
| 2014/0302915 A1 | 10/2014 | Lyons et al. | |
| 2015/0011309 A1 | 1/2015 | Eloff et al. | |
| 2015/0072767 A1 | 3/2015 | Montenegro et al. | |
| 2015/0072774 A1 | 3/2015 | Anderson et al. | |
| 2015/0087405 A1 | 3/2015 | George et al. | |

FOREIGN PATENT DOCUMENTS

| | | |
|---|---|---|
| WO | 2007075380 A2 | 7/2007 |
| WO | 2014107787 A2 | 7/2014 |

OTHER PUBLICATIONS

Apsima-Player 360 description, "A look inside Player 360", www.apsima.com, May 26, 2015.

Kevin Peng et al., "Security Overview of QR Codes", MIT course 6.857 project report, https://courses.csail.mit.edu/6.857/2014/projects, May 26, 2015.

\* cited by examiner http://qrezpay.com?id=FZWBTPESK

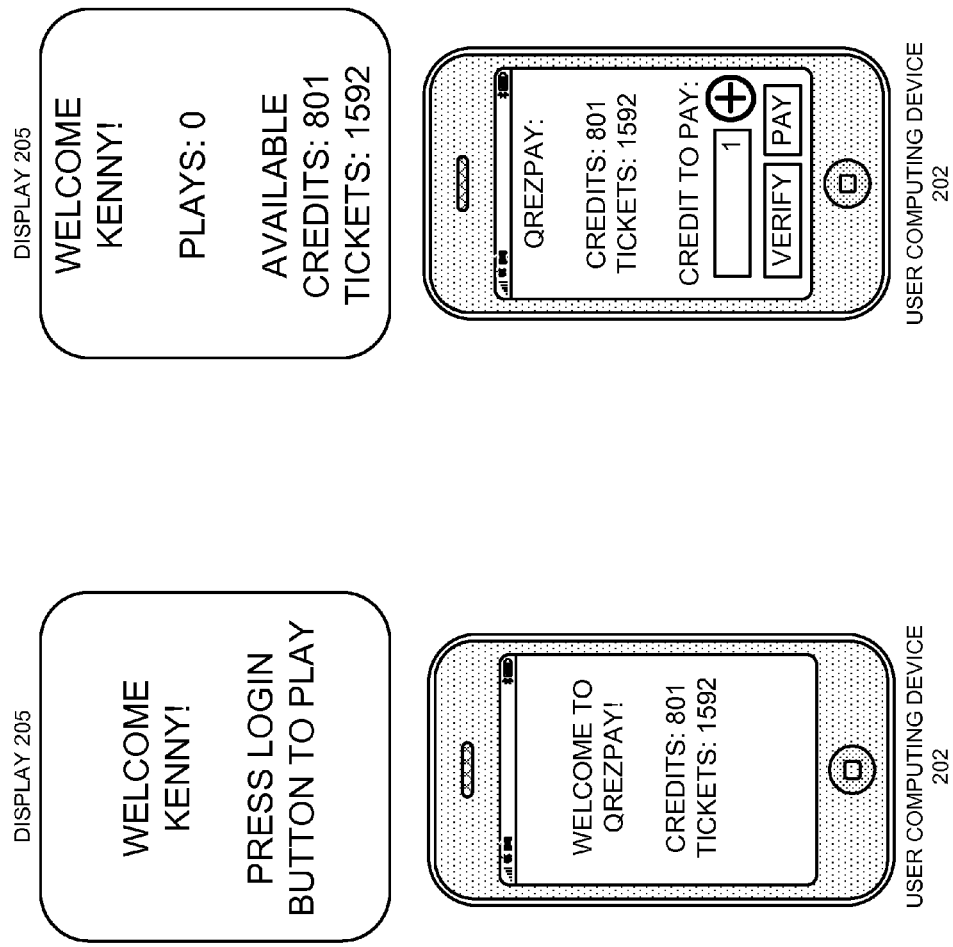

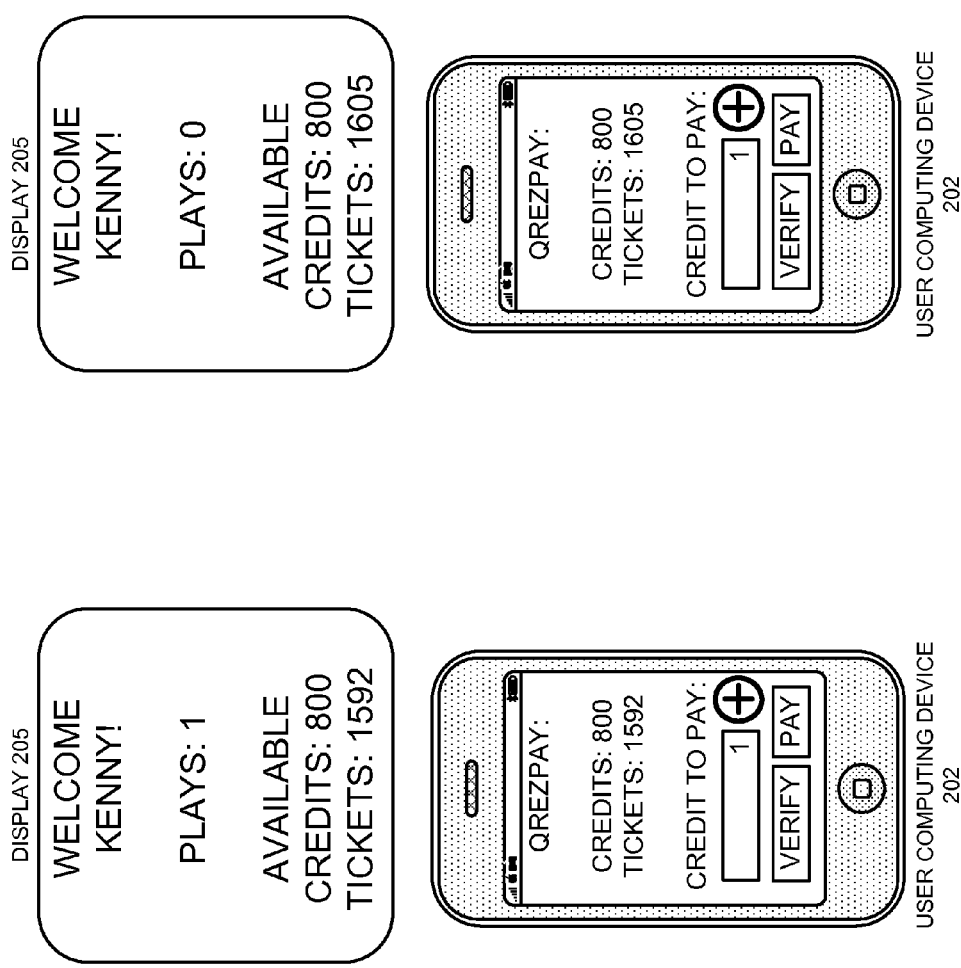

FACILITATING ACCESS TO A TARGET DEVICE

RELATED APPLICATION

This application claims the benefit of U.S. Provisional Patent Application No. 62/033,803, by inventors Kenny Phan and George Samaha, entitled "Circuitary and Systems for Replacing Existing Hardware I/O Mechanisms," filed 6 Aug. 2014, which is incorporated herein by reference.

BACKGROUND

Field of the Invention

This disclosure generally relates to techniques for managing access behavior to target devices. More specifically, this disclosure relates to techniques for tracking, accessing, and applying credit and prize balance information for redemption-style games.

Related Art

Redemption games are provided in many family entertainment centers and other establishments. These games are typically arcade games of skill (such as skee-ball) that reward a player proportionally to their score in the game. Such games typically accept cash as input, and provide rewards that most often comes in the form of physical tickets (with more tickets being awarded for higher scores), which can then be redeemed at a central location for prizes.

Saving and redeeming large numbers of tickets can be unwieldy, and thus some games are configured to support credit-card style cards that track both the remaining available credits as well as the number of tickets that have been won. However, credit-card style cards do not provide users with a ubiquitous way to determine how many credits remain available nor how many tickets they have acquired. Typically such cards can be swiped at specific stations at the host location to determine this information, but such locations are limited and not useful to anyone attempting to determine their balances when they are off the premises of the establishment.

Hence, what is needed are techniques and systems for accessing and applying credit and reward balances without the above-described problems of existing techniques.

SUMMARY

The disclosed embodiments disclose techniques for facilitating access to a target device. During operation, a target device presents a unique code to a user device that is located in proximity to the target device. The user device presents this unique code to a management server that is associated with the target device to gain access to the target device, with the management server linking the two devices. The target device receives notification that the user device has been linked and displays a set of received user account information on a display. Subsequently, the target device receives notification from the management server that the linked user device has applied a credit to the target device, and initiates an operation that is associated with consuming the credit.

In some embodiments, presenting a unique code to the user device involves displaying a unique barcode on the display of the target device. The user device scans and decodes this barcode using a camera to decode the unique code, and then presents the unique code to the management server along with authentication information to gain access to the target device.

In some embodiments, the target device receives the unique code and/or unique barcode from the management server. For instance, the target device may generate a unique barcode using the unique code, or may receive the entire unique barcode from the management server already. The target device displays the unique barcode for a specified interval, and then upon receiving a second unique code and/or barcode from the management server, discards the first barcode and displays a second unique barcode. Periodically changing the barcode that is displayed by the target device facilitates ensuring that only presently physically proximate user devices and link to access the target device. Not that in some scenarios barcodes may repeat over time, but that generally at any specific instance in time (or any specific short time interval in time) each target device being managed by the same management server displays a unique, distinct barcode.

In some embodiments, presenting a unique code to the user device involves transmitting the unique code to the user device using near-field communication (NFC). The user device presents the unique code that was received via NFC to the management server along with authentication information to gain access to the target device.

In some embodiments, the target device receives the unique code from the management server. The target device broadcasts the unique code for a specified interval using NFC, and then upon receiving a second unique code from the management server, discards the first code and broadcasts the second code. Periodically changing the code that is broadcast by the target device facilitates ensuring that only presently physically proximate user devices and link to access the target device. Not that as described for barcodes above, in some scenarios codes may repeat over time, but that generally at any specific instance in time (or any specific short time interval in time) each target device being managed by the same management server broadcasts a unique, distinct code.

In some embodiments, receiving notification that the user device has been linked to the target device involves allowing the user device to apply credits to the target device, displaying balance information associated with the user account on both the display of the user device and on the display of the target device, and directing an output from the credited operation on the target device to the user account.

In some embodiments, the target device is a redemption game machine, consuming the credit comprises initiating game play on the redemption game machine, and the out is a reward that is won during the game play and credited to the user account.

In some embodiments, directing the output to the user account involves information the management server of the reward that is to be credited to the user account and updating both the displays of the target device and the user device to reflect an updated reward balance for the user account.

In some embodiments, the management server: (1) monitors the activity of the target device; (2) detects operations that indicate the end of an operation on the target device (e.g., the end of play on a redemption game) and/or the expiration of a specified inactivity timeout; and (3) upon detecting such situations, unlinks the user and target devices.

In some embodiments, upon receiving an unlink notification, the target device notifies its associated management server of any remaining unused credits. The management server then credits these unused credits back to the user account while unlinking the two devices.

In some embodiments, confirming that the user device has been linked to the target device involves receiving an indication at the target device that a user device is requesting access, displaying a message requesting confirmation of physical proximity, and, upon receiving confirmation, linking the user device with the target device.

In some embodiments, receiving confirmation of physical proximity involves receiving a button press event on the target device within a specified time interval of displaying the message.

In some embodiments, multiple target devices are linked with the user device. The user device displays and can apply credits to the set of linked target devices.

In some embodiments, the user device receives a unique code from a target device that is located in the user device's proximity. The user device presents this unique code and authentication information for a user account to a management server for the target device to gain access to the target device. Upon authenticating the user account, the management server sends user identification and account balance information to the target device and the user device. This information is displayed on both the displays of the target device and the user device. Upon receiving a subsequent request (e.g., from a user), the user device applies a credit to the target device. The user device sends this request to the management server, which subtracts the credit from the user account and notifies the target device of the applied credit, thereby initiating an operation on the target device.

BRIEF DESCRIPTION OF THE FIGURES

FIG. 3A illustrates a first set of exemplary device display outputs for the scenario of FIG. 2 in accordance with an embodiment.

FIG. 3B illustrates a second set of exemplary device display outputs for the scenario of FIG. 2 in accordance with an embodiment.

FIG. 3C illustrates a third set of exemplary device display outputs for the scenario of FIG. 2 in accordance with an embodiment.

FIG. 3D illustrates a fourth set of exemplary device display outputs for the scenario of FIG. 2 in accordance with an embodiment.

FIG. 3E illustrates a fifth set of exemplary device display outputs for the scenario of FIG. 2 in accordance with an embodiment.

FIG. 3F illustrates a sixth set of exemplary device display outputs for the scenario of FIG. 2 in accordance with an embodiment.

DETAILED DESCRIPTION

Figures 1A, 1B:
FIG. 1A illustrates an exemplary barcode in accordance with an embodiment.
FIG. 1B illustrates the data decoded from the exemplary barcode of FIG. 1A in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Redemption Games

As mentioned above, redemption games are provided in many family entertainment centers and other establishments. These games are typically arcade games of skill (such as skee-ball) that reward a player proportionally to their score in the game. The reward most often comes in the form of physical tickets, with more tickets being awarded for higher scores. These tickets can then be redeemed for prizes (hence the name "redemption games") at a central location. Some inexpensive prizes (e.g., candy, small plastic or rubber toys) may only require a small number of tickets to acquire, while more expensive prizes (e.g., skateboards, low-end electronics, etc.) may require thousands of prize tickets (or more). Such games are often designed to ensure that the amount of money that needs to be spent to win enough tickets for a given prize typically far exceeds the value of the prize itself. For instance, some redemption games may involve elements of chance that can be configured by the operator to achieve a desired profit.

Saving and redeeming large numbers of tickets can be unwieldy, and thus some games are configured to support credit-card style cards that track both the remaining available credits as well as the number of tickets that have been won.

Some redemption games are configured to accept coins or cash as inputs and provide physical tickets as outputs. However, both carrying many coins as well as saving and redeeming large numbers of tickets can be unwieldy. Thus, some games are configured to support credit-card style cards that track both the remaining available credits as well as the number of tickets that have been won. However, credit-card style cards do not provide users with any indication of how many credits remain available nor how many tickets they have acquired. Typically such cards can be swiped at specific stations at the host location to determine this information, but such locations are limited and not useful to anyone attempting to determine their balances when they are off the premises of the establishment.

In some embodiments, the input/output (I/O) mechanisms of a target device (e.g., a redemption game) are configured to include an interface that enables a user device (e.g., a smartphone, tablet, smart watch, or other network-enabled portable computing device) to access and interact with the target device (e.g., to apply credits and receive prize ticket or other information). More specifically, advanced I/O techniques can be used to: (1) enable users to access credit information and add credits to a target device directly from a user device; and (2) observe ticket amounts in real time directly from the user device (from any network-enabled location) without having to swipe a credit-card style card at a special station.

In some embodiments, accessing and interacting with the target device involves using techniques that facilitate data transfer between the target device and a camera-equipped user computing device. For instance, information can be encoded into a machine-recognizable format (e.g., a two-dimensional "Quick Response (QR) code") that can be easily scanned and decoded using a mobile phone camera. Such machine-recognizable formats serve to facilitate error-free data entry, and can be integrated into a range of authentication and access techniques.

FIGS. 1A-1B illustrate the encoding of data in a QR code. More specifically, the QR code illustrated in FIG. 1A encodes an HTTP address that can be used to access the target device (either directly or via a management server). The decoded HTTP string is illustrated in FIG. 1B. Note that the described techniques are not limited to barcodes or QR codes (which can encode on the order of 2000-7000 characters), but can use a range of single- and/or multi-dimensional machine-recognizable encoding formats with a range of data densities. For instance, a data provider may choose an encoding based on the amount of data that needs to be encoded and on the imaging and decoding capabilities of the intended target devices. Note that the term "barcode" is used generally in the following disclosure, and may refer to any machine-recognizable format. Note also that in some embodiments the data encoded may also be compressed to allow additional data to be stored in the barcode.

In some embodiments, near-field communication (NFC) techniques may also be used to transfer information between the target device and a user device. NFC techniques typically involve establishing radio communication to transfer information between two devices that are in close physical proximity.

Figure 2:
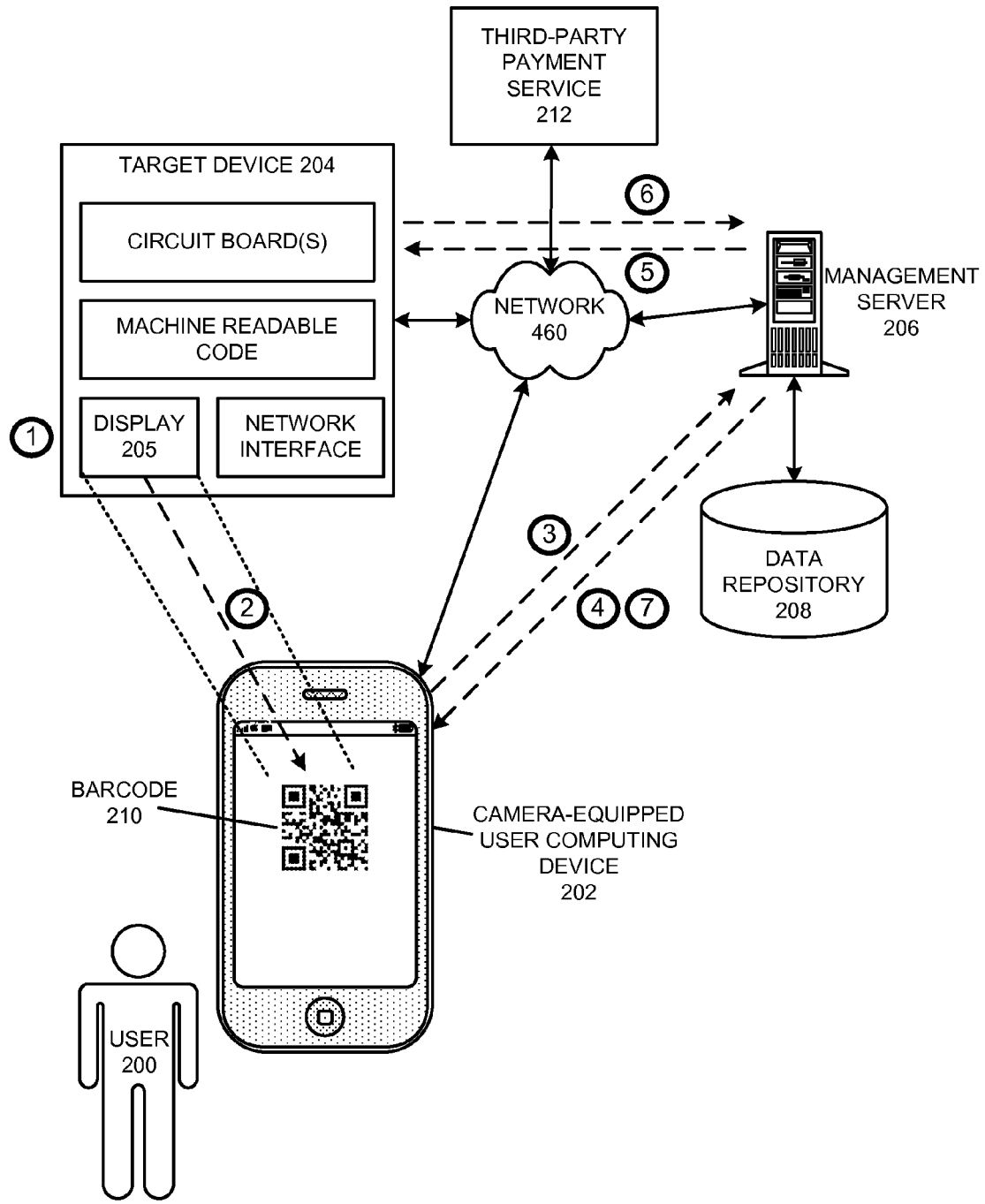
FIG. 2 illustrates an exemplary system in which in which a user interacts with a target device using a camera-equipped computing device in accordance with an embodiment.

FIG. 2 illustrates an exemplary system in which a user 202 uses a camera-equipped user computing device 202 to interact with a target device 204 using the disclosed techniques. Target device 204 may be a redemption game, casino game, or a range of other computing device types, and may comprise (but is not limited to) one or more of one or more circuit boards and/or processors, machine-readable code, a display 205, and a wired and/or wireless network interface. Note that the circuit board may be an aftermarket circuit board that is added to an existing target device after manufacture, or may also be fabricated and included in a target device at the time of manufacture of the target device. The network interface facilitates communication over a network (e.g., a local area network (LAN), a wide area network (WAN), a wireless network (e.g., a wifi network, Bluetooth network, cellular network, etc.), the Internet, or any other type of network) with a management server. Management server 206 may be located in a remote location (e.g., a remote data center or cloud computing center, such as Amazon Web Services™ (AWS) or Microsoft Azure™), or may be located at the same location as target device 204 (e.g., co-located at the establishment that operates a target device and/or operated by an organization or company that hosts the target device).

In one exemplary scenario in which target device 204 is a game machine, target device 204 displays in display 205 a unique barcode 210 (e.g., the barcode illustrated in FIG. 1A, which in this scenario includes addressing information for management server 206) (operation 1). Upon deciding to access target device 204, user 200 uses computing device 202 to scan (e.g., take a picture of) barcode 210 from display 205 of target device 204 (operation 2). Upon scanning barcode 210, user computing device 202 uses the information encoded in barcode 210 to access management server 206 (operation 3). Management server 206 and/or an application executing on computing device 202 can then be used to present user 200 with a user interface that enables user 200 to perform operations to be applied to target device 204 (operation 4). For instance, if target device 204 is a game machine, one possible operation might be to apply credits to target device 204. This operation may involve contacting management server 206 to determine whether an account associated with user 200 has any available credits, which may further involve querying a data repository 208 associated with management server 206 and/or accessing a third-party payment service 212 (e.g., Paypal™) (operations not shown). Upon successfully determining that credits are available for user 200, management server 206 can communicate to target device 204 that credits are being applied (operation 5), thereby unlocking gaming functionality in target 204 and allowing user 200 to play the appropriate number of credited games. Thus, the disclosed techniques facilitate unlocking target device functionality via a user computing device.

Some types of devices (e.g., redemption-style games, as described above) award prizes after certain operations have been completed. In such instances, target device 204 can communicate any such rewards (e.g., tickets, additional credits, monetary awards, etc) to management server 206 (operation 6), which then updates user 200's account to reflect the application of these rewards. Management server 206 can also transmit notification of such awards to user computing device 202 (operation 7) and/or instruct target device 204 to update display information (operation not shown). Subsequently, if the user redeems accumulated rewards, management server 206 can debit the appropriate awards balance from the user account (e.g., by updating data repository 208 and/or notifying third-party payment service 212) (operation not shown). User 200 can also use user computing device 202 to add credits to (or otherwise service) their accounts with management server 206 and/or third-party payment service 212.

FIGS. 3A-3F illustrate a set of exemplary display screens for both the display 205 of the target device 204 and the display of user computing device 202 for the exemplary scenario illustrated in FIG. 2. As illustrated in FIG. 3A, at the beginning of the interaction, display 205 displays barcode 210 and a welcome message. User 200 scans this barcode 210 using computing device 202, and computing device 202 uses the information from barcode 210 to connect to and/or access management server 206 (e.g., using an HTTP address found in barcode 210). As illustrated in FIG. 3B, management server 206 (and/or an application on device 202) then presents a login screen (described in more detail below) to authenticate user 200. After user 200 successfully enters login information (e.g., an account username, email address, and/or phone number and associated password) and logs in, device 202 may access and display the user's current credit and ticket balances, as illustrated in FIG. 3C. In this timeframe, target device 204 may (optionally) display a welcome screen displaying the user's name (e.g., "Kenny"), and request that user 200 indicate physical presence by pressing a login button (e.g., either a physical button, or a virtual button displayed on display 205 if display 205 is a touch screen). After this (optional) verification step, device 202 and target device 204 are "linked" (as described in more detail below) and, as illustrated in FIG. 3D, display 205 may be updated to display the number of current plays available along with the user's balance information, while device 202 displays similar balance information and presents user 200 with the option to send credits to target device 204 or re-verify the connection (as described below in more detail). In FIG. 3E, user 200 has selected to apply a credit, prompting management server 206 to send a credit to target device 204, and resulting in the displayed available credits being decremented appropriately on both devices 202-204. At this point user 200 can play a game on target device 204, and wins 13 additional tickets. After the game has been played, target device 204 informs management server 206 of any tickets that were won; in this example, 13 tickets are added to user's ticket balance, and the displays of both devices are updated (as illustrated in FIG. 3F).

Note that the format and contents of displayed balances may vary based on the type of target device. For instance, in redemption games the credit balance may indicate a number of tokens that are available (e.g., with each token having a value of 25 cents) and a number of tickets that have accumulated from wins. In casino games, however, the balance may be a dollar amount, and winnings accumulate by increasing the credit value (e.g., no tickets are involved or displayed). Users can add credit to their account by logging in (either after going through the authentication process of linking to a target device or by logging in separately) using a range of payment methods (e.g., a credit card, a third-party payment mechanism, etc.).

Figure 6:
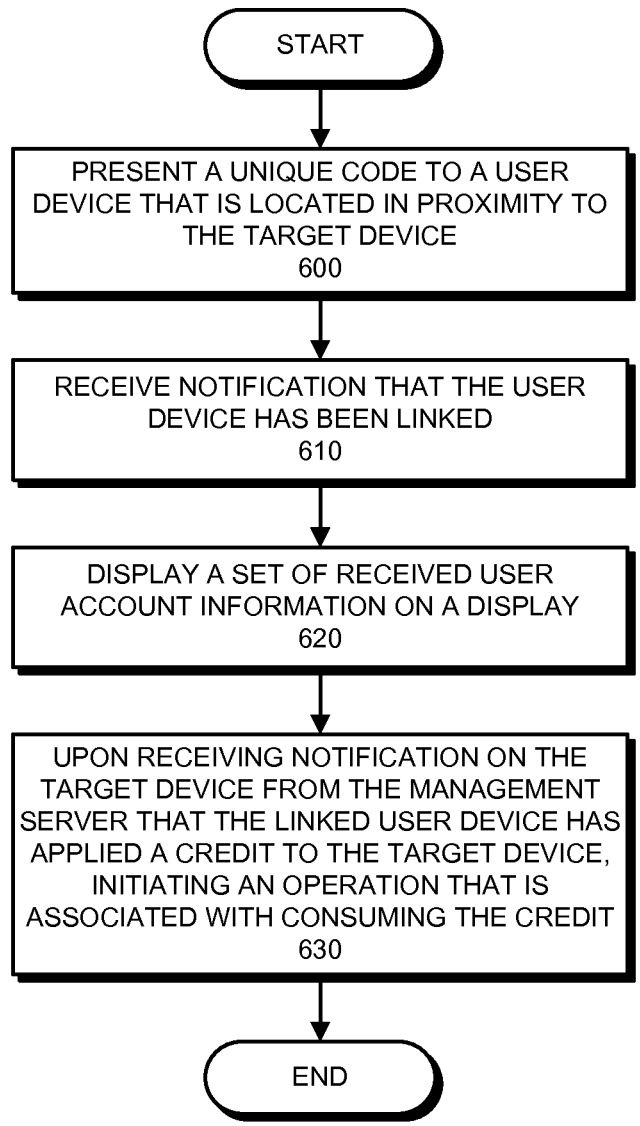
FIG. 6 presents a flow chart that illustrates the process of facilitating access to a target device (from the perspective of the target device) in accordance with an embodiment.
Figure 7:
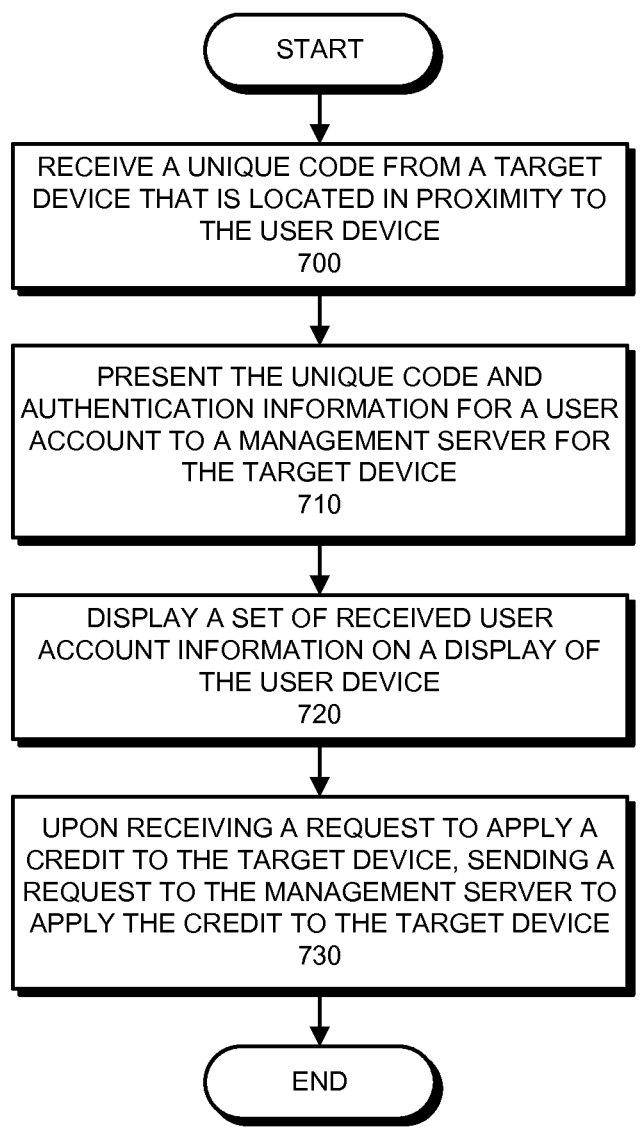
FIG. 7 presents a flow chart that illustrates the process of facilitating access to a target device (from the perspective of the user device) in accordance with an embodiment.

FIGS. 6-7 present flow charts that illustrate the process of facilitating access to a target device. FIG. 6 illustrates the process from the perspective of the target device, while FIG. 7 illustrates the process from the perspective of the user device. For FIG. 6, during operation, a target device presents a unique code to a user device that is located in proximity to the target device (operation 600). The user device presents this unique code to a management server that is associated with the target device to gain access to the target device, with the management server linking the two devices. The target device receives notification that the user device has been linked (operation 610) and displays a set of received user account information on a display (operation 620). Subsequently, the target device receives notification from the management server that the linked user device has applied a credit to the target device, and initiates an operation that is associated with consuming the credit (operation 630).

For FIG. 7, during operation, the user device receives a unique code from a target device that is located in proximity to the user device (operation 700). The user device presents this unique code and authentication information for a user account to a management server for the target device to gain access to the target device (operation 710). Upon authenticating the user account, the management server links the two devices, and sends user identification and account balance information to both devices, which display this information (operation 720). Subsequently, upon receiving a request to apply a credit to the target device, the user device sends a request to the management server to apply the credit to the target device (operation 730).

In some embodiments, additional information may be sent to and displayed on the user device. For instance, based on the type of target device, a management server may send additional information to and/or offer additional options via the user device. Some specific examples include:

Vending machines: If the target device is a vending machine, the set of options may facilitate choosing an item to purchase as well as one or more options for that item. For example, for a coffee vending machine the user device may be configured to receive and display a screen that allows a user to select a specific coffee type as well as options such as sugar, milk, etc. The described techniques can also be used to order items at restaurants, with the management server sending a menu and menu options to the user device for selection (e.g., after the login and authentication steps above, presenting a menu on the target device that allows the user to select and order various items and options).

Bank-style devices: If the target is a banking-type machine (e.g., an automated teller machine, or ATM), the user device may authenticate itself as described above to access banking functionality. For instance, instead of swiping a plastic card, a user may instead scan a barcode, login, and then receive on the user device a set of transaction choices (sent by the management server). Such capabilities allow the user device to replace plastic cards, thereby providing substantial user convenience.

Point-of-sale devices: The target device may be used in a retail store or gas pump to facilitate payment for goods or services. For instance, a user may be able to select items for purchase, scan them using the target device or a separate device (e.g., a store's regular scanner), be presented with a generated barcode on the target device (after completing the scanning of items), and then scan that subsequent barcode to authenticate and pay for the items. In this scenario, the information sent to and displayed on the user device may include an itemized list of the items being purchased.

Accumulation of incentives: The described techniques can be used in conjunction with other incentives. For example, after performing a transaction using the user device, a user may be presented with some other incentives, such as the accumulation of gift points, coupons, frequent flier miles, etc. In some scenarios these may be added (and displayed on the user device) automatically following the transaction. In other scenarios, a target device may display a second code along with the offered incentive following an initial transaction, allowing the user to decide whether to scan the second offer or not. For instance, an incentive offer may comprise a fixed amount and/or a percentage of a previous purchase, and may be a set of points that can be: (1) accumulated and used later as rebates for subsequent transactions from the user device; (2) rewards that can be accumulated to win a prize; and/or (3) one or more entries into a prize drawing.

Advertising: The described techniques can be used to facilitate advertising incentives. Static barcodes (especially QR codes) are often incorporated into advertisements to direct viewers to an advertiser's website. The disclosed techniques facilitate the use of dynamic advertisements that can offer rebates and/or rewards in conjunction with directing a user to the advertiser's website. For example, instead of just directing the user to the website, a dynamic advertisement can also allow a user to authenticate the visit to receive a coupon in their user account (e.g., a coupon giving a specific dollar amount discount, percentage discount, or other discount if used within a specified time interval, at a specified shop, etc.). Such coupons can be accumulated in the user account (e.g., managed by the management server), and can then be applied when the user subsequently performs a transaction using the user device (and user account) that involves the specified vendor and/or item.

Keyless entry: The described techniques can be used to facilitate keyless entry, with the target device controlling a locking mechanism that opens a door. Unlocking the door might involve receiving a unique user code (e.g., by scanning a barcode code), authenticating with the management server, and then selecting an option to open the door. The management server and/or target device may be configured with management, administration, and/or tracking capabilities that facilitate selectively controlling access times and/or permissions on a per-person basis as well as tracking entries, exits, and access patterns. Such techniques may be used both for exterior doors as well as interior locations and specialized devices (e.g., locks, safes, etc). Furthermore, the management server may be configured to allow users to create "virtual keychains" (e.g., select from a list of items on a display or webpage) that are associated with a master password and allow a user to save multiple entry codes and control access without subsequent scanning and/or authentication, thereby allowing users to replace a physical keychain with their user device. This, in combination with the above-described variations, enables users to replace both their credit cards and keys with the user device. This virtual keychain can be further enhanced to perform home or factory automation (e.g., control lighting, cooling, entertainment devices, and other devices). In some embodiments, such capabilities may require additional secondary checks on the user device to ensure that a stolen but not-yet-revoked user device cannot be stolen and used to access protected resources (e.g., a periodic biometric check on the user device using a fingerprint in addition to a periodic password authentication when accessing a target device).

Emergency situations and/or simulation: The described techniques can be used to facilitate emergency rescues or simulations. For instance, either static or dynamic barcodes may be placed at different locations (e.g., within a building or in the surrounding area) that can be scanned to notify authorities or other management services that a person has reached the specified point and/or needs assistance. In some instances authentication may be less desirable in such situations (e.g., by adding delay in an emergency situation), but the management server may still be able to determine the identity of the user based on an association between a specific user device and a specific user. In some instance, each given user's user device may be registered with a management server to provide emergency identification and/or signaling capabilities.

In some embodiments, the barcode displayed on each target device is unique and changes periodically, thereby increasing the likelihood that a user accessing the target device is in physical proximity to the device. For instance, a management server may be configured to send the target device a new barcode on a regular (or non-deterministic) time interval (e.g., every 5 seconds, minute, etc). Alternatively, the target device may be configured to generate new barcodes and notify the management server. Such settings may be adjusted based on the establishment hosting the target machines and/or the type of machines, as well as other factors, but generally discourage third parties from copying the barcode and attempting to log in from a remote location not near the target device. Some reward-based machines may be considered to have more valuable rewards, and hence include additional mechanisms to discourage attempts at remote operation. A management server may be configured to remember a moving window of values used in recent barcodes to ensure that slightly delayed user logins (e.g., login attempts that occur just as the barcode is changing or suffer from some network delay) can still be used, thereby reducing user inconvenience. Note also that displaying or changing the barcode on the target device may involve flashing a backlight on the display and/or changing the location of the barcode within the display to distinguish from malicious attempts to gather user login info (e.g., placing a sticker with a fraudulent barcode on top of the display of the target device).

In some embodiments, target devices may include additional mechanisms to ensure the physical presence of an operator. As described in the earlier example, some target devices may include a physical login button that needs to be pressed within a specified time interval after a user has initiated access to successfully link a user device with the target device. Target devices that include a touch screen may include a virtual login button and/or may present some additional interface (such as a virtual or physical keypad), where the user needs to enter a value that is displayed on the user's device during the login process. Such options may depend upon the physical capabilities of the target device; for instance, an alternative for a target device with only a single login button may be to specify (via the user device) that the login button be pressed a specified number of times (and/or with a specified pattern) within a given time interval. In some embodiments, a user (and/or establishment owner) may specify a desired level of security that then determines the set of mechanisms that are used based on each device's capabilities.

In some embodiments, a target device may include a credit button that allows the user of a linked user device to apply additional credits from the user's account to the target device (e.g., as if the user had pressed the pay button on the user device). In some embodiments, this credit button can also provide the same functionality as the above-described login button (e.g., by proving that the user is in front of the machine). However, such capabilities may need to be combined with other functionality that ensures that other subsequent (unlinked) users of the target device cannot continue to add credits to the target device via the first user's account without permission.

In some embodiments, one or more configuration options may determine how long a user and a target device remain linked, both to maximize user convenience as well as to also minimize chances of erroneous and/or abusive behavior. For instance, options may include one or more of the following: (1) allowing the user to set a desired minimum and/or maximum link time interval via their user device; (2) allowing the owner or operator of a target device to set a desired time interval and/or link re-affirmation protocol; (3) setting the link to remain active for the current set of applied credits; and/or (4) setting the link to remain active for a short additional time interval past completing play for the last credit, so that the user can add more credits without having to repeat the sign-in operation for the target device. Depending on target device capabilities, a target device may also be configured to indicate to a user that the link interval is expiring, thereby allowing the user to add more credits or otherwise indicate that the link should be kept active. For instance, a target device with a backlit display may flash the display light and display a warning indicating that the link interval is set to expire shortly. The target device may also be configured to display the remaining time in the current link interval and/or display some user-selected and/or other icon to indicate that a specific user is currently linked to the target device.

In some embodiments, a verify option (e.g., a verify button) on the user (and/or target) device can be used to prompt the target device to verify that the target device is linked to the user and/or display a currently linked user's balance values on the target device display. For some categories of target devices, a verification request may also prompt the target device to flash the back-light of its display for a tie interval to visually remind the user which target device they are currently linked to. A display backlight may also be flashed to indicate other user interactions and activity (e g, linking to the target device, applying credits, receiving rewards or credits). Such identifying behavior may be useful when multiple enabled target devices are nearby, to allow players who briefly leave a target device to be able to identify the target device they were using when they return.

In an alternative example, a user might configure a set of options to request that balances and user identification information are always displayed on the user device but only shown on the linked target device for a brief interval and/or when the user explicitly pushes the verify button. Such a setting might be more desirable on target devices that involve valuable credits and/or rewards (e.g., a casino machine).

In some embodiments, a user may also be able to explicitly end a play session and even re-collect unused credits. For example, a user that has applied a number of credits to a given target device may suddenly need to cancel and leave. The user device (and/or target device) may include a physical or virtual log-off button that can be used to indicate to the management server that any remaining credits should be withdrawn from the target device and re-applied to a user's account. A target device (and/or user device) may be further configured to detect a break in activity and either disconnect (or send a log-off request) automatically. Alternatively, another configuration parameter for the user device may leave existing credits on the target device, thereby letting other players play for free (and potentially gaining such players' rewards).

In some embodiments, a user device and management server may be configured to allow a single user device to simultaneously link to multiple target devices. For example, a parent taking multiple children to an amusement center may want to simultaneously link to, credit, and collect the rewards for multiple game machines. The user device can be configured to make such behavior more convenient for users. For instance, after logging into a first machine, the user device may reuse the previously authenticated connection to the management server when accessing additional target devices. The user device may also be configured to display a list of linked devices, and allow the user to apply credits to target devices on a per-device basis. The user device may be further configured to allow the user to log off of individual target devices or all target devices, as desired. Alternatively, the user device may instead be configured to optimize behavior for a single user so that whenever the user device is linked to a new target device the management server ensures that the previous target device is unlinked (and that any outstanding credits applied to the previous target device are recovered). Note that in many of these exemplary scenarios, only the user device can add credits to the linked target devices, and thus the user remains in control of the application of credits to the target devices.

In some embodiments, location awareness for the user device can be leveraged to enhance the security of the target devices. For instance, management server may determine location information from a requesting user device (e.g., a network address, GPS coordinates, or other identifying information) that can be used to infer whether the user device is indeed in the same geographic location. Geographic information can also be used to benefit the user; for instance, the management server or user device may detect when the user device is leaving the proximity of linked target device(s), and terminate the link(s).

In some embodiments, social networks (such as Facebook™) can also be integrated into the multi-device interaction to both further enhance the user experience as well as to benefit the profitability of target devices. For instance, the authentication application on the user device may be linked to a user's social media account, and the username displayed on the target device is the user's social media account name. Social media integration enables another range of possible activities that comprise: posting high scores to a social media account; requesting friends to join and/or compete for a given target device; and linking multiple users who interact with the same target device (e.g., allowing users to challenge each other, discuss game tips, etc.).

Implementation Options and Computing Environment

Redemption and casino games often include I/O peripherals that connect to a main circuit board. For instance, connected I/O devices may include: a bill-validator that receives paper currency; a coin-acceptor that receives coins; a ticket-dispenser that distributes reward tickets; a printer that prints reward tickets or vouchers; and a coin-hopper that dispenses coins. A circuit board that implements the above-described techniques may replace or complement such peripherals on a target device. For instance, target devices may initially be configured to still enable payment with physical currency and output physical tickets in response, while also supporting connections from user devices, dispensing virtual rewards via the management server in such instances.

In some embodiments, a circuit board that provides the above-described functionality may be configured to emulate other known target device peripherals. For instance, the circuit board may be configured to simulate a printer interface to receive ticket print requests; instead of printing something, the circuit board is configured to parse the print request to determine and send the reward amount to the management server. Similarly, by emulating a coin-hopper the circuit board can receiving notification of a number of coins to be paid, and forward this information to the server which in turn credit's the linked user's account. When the player sends credits to the target device (via the management server), the circuit board receives that information and can act like a bill-acceptor inside the machine to award the credits. Alternatively, the circuit board may also be configured to simulate a magnetic or smart-card reader/writer interface that is used to interact with existing smart cards. Note that the circuit board can also include an interface that controls motors and/or other electrical appliances (e.g., to control vending machines, parking meters, washing machines, cameras, conveyor belts, etc.).

Note that in some embodiments, a target device may be configured to be a "dumb terminal" that is not aware of the notion of being linked to a user device, and never interacts directly with the user device. In such embodiments, the target device merely receives instructions from its associated management server of what to display or broadcast on its local display, and when to apply a credit. In alternative embodiments, the target device may include additional functionality that facilitates richer, direct interaction with a linked user device (or a user device that is attempting to link with the target device) and offloads some of the communication and management load from the management server.

Figure 4:
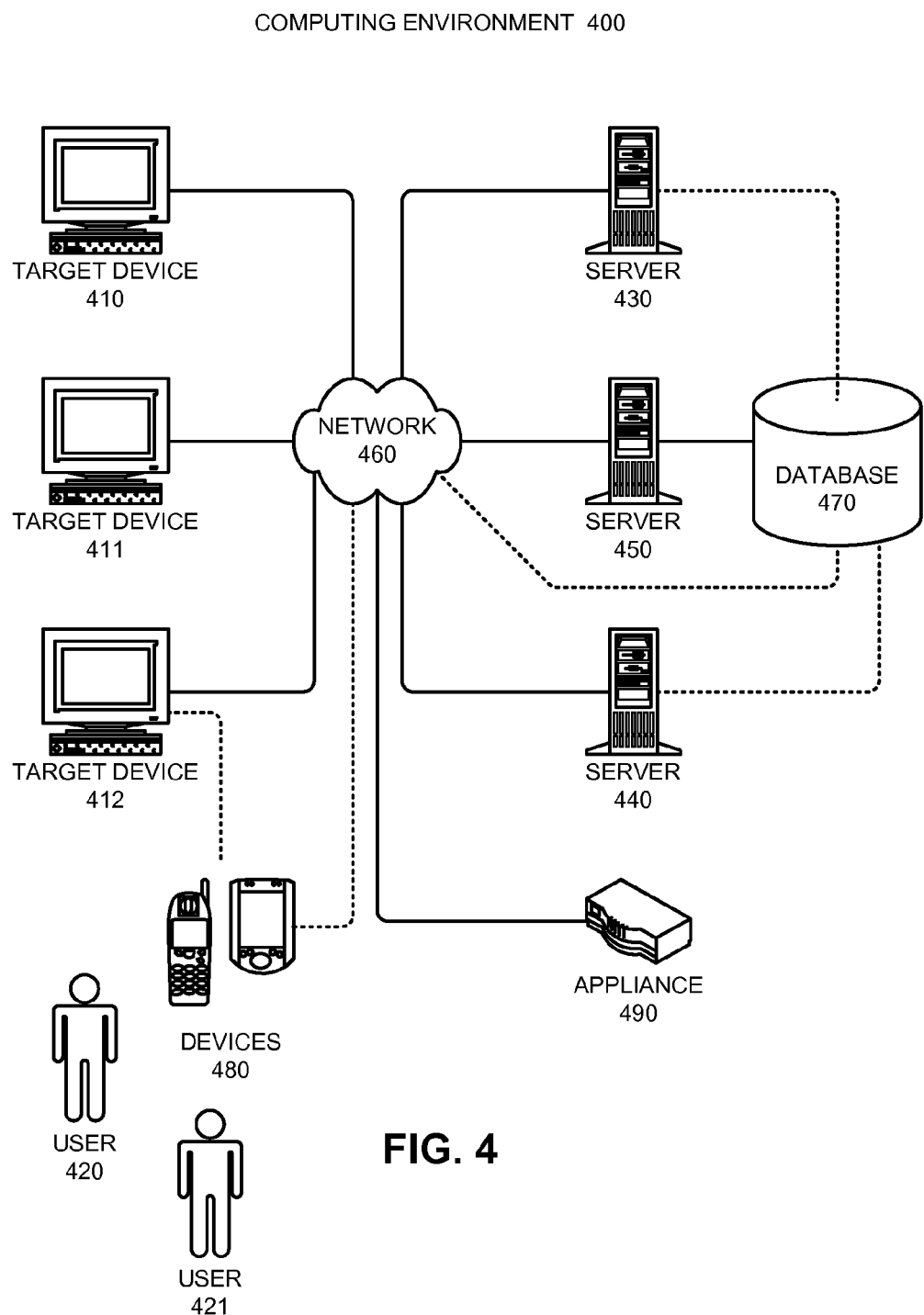
FIG. 4 illustrates a computing environment in accordance with an embodiment.

In some embodiments of the present invention, techniques for accessing target devices can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes target devices 410-412, users 420 and 421, servers 430-450, network 460, database 470, devices 480, appliance 490, and cloud-based storage system 495.

Target devices 410-412 can include any node on a network that includes computational capability and includes a mechanism for communicating across the network. Similarly, servers 430-450 can generally include any node on a network including a mechanism for servicing requests from a target device for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes and target devices 410-412. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a target device, or directly to a network. Alternatively, other entities in computing environment 400 (e.g., servers 430-450) may also store such data.

Devices 480 can include any type of electronic device that can be coupled to a target device, such as target device 412. This includes, but is not limited to, cell phones, personal digital assistants (PDAs), smartphones, personal music players (such as MP3 players), gaming systems, digital cameras, portable storage media, or any other device that can be coupled to a target device.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440, devices 480, target devices 410-412, and/or network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
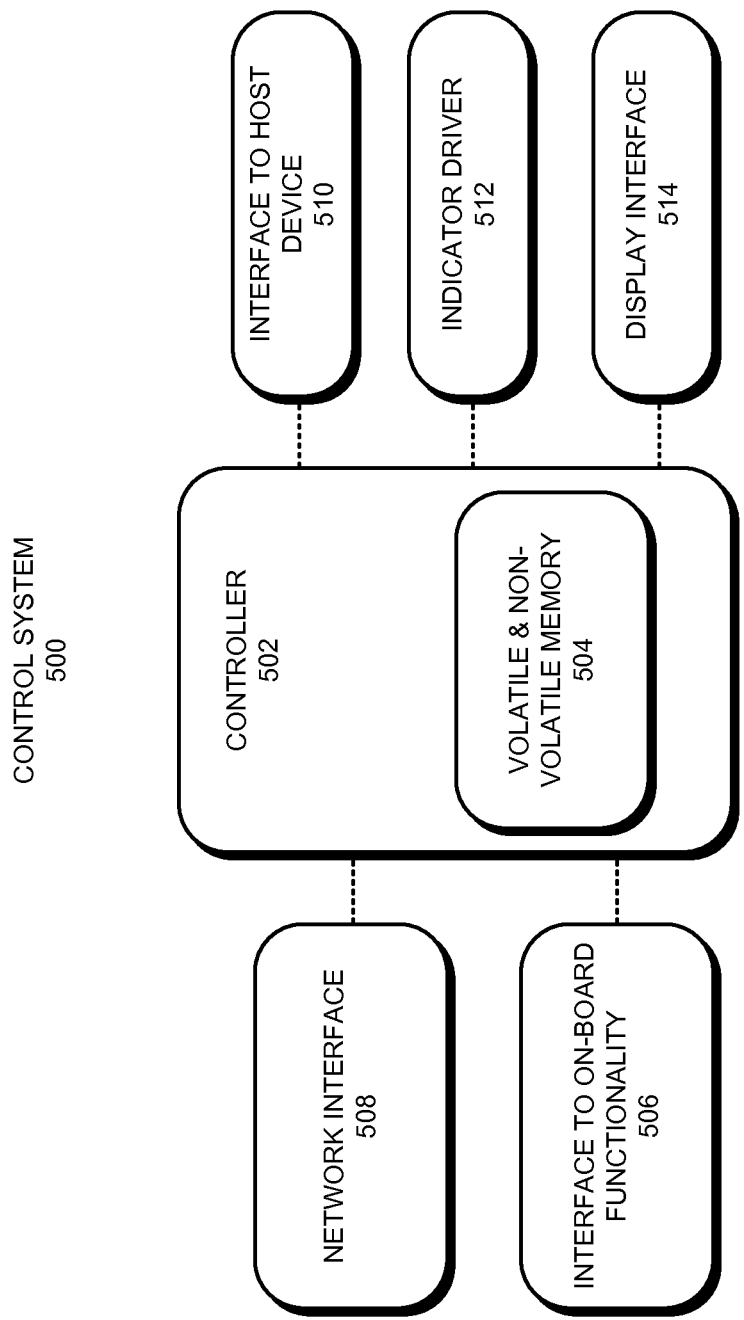
FIG. 5 illustrates a functional diagram for a control system in a target device in accordance with an embodiment.

FIG. 5 illustrates a functional diagram for a control system 500 in a target device that facilitates the above-described techniques. Control system 500 comprises: a controller 502 (which may include a processor and/or other control circuitry as well as both volatile and non-volatile memory 504); a network interface 508 (which may support wireless and/or wired network connections); an interface to on-board functionality 506 (e.g., that supports the login button described above, or facilitates the reset of control system 500 if needed); an interface to other peripherals or control systems in the host target device 510; a indicator driver 512; and/or a display interface 514. Interface to host device 510 may be used to allow control system 500 to simulate the behavior of a typical target device peripheral (e.g., a bill/coin acceptor and/or ticket-dispenser/coin-hopper). Indicator driver 512 facilitates controlling the backlight of a display associated with control system 500 or other indicators associated with the control system 500 to indicate the success or failure of access operations to a user. Display interface 514 controls the output of the control system 500's display (e.g., to display a barcode, user balance values, etc.).

In some embodiments, the management server is configured to track the status and link information for a large number of users and target devices. For instance, each user and target device may be associated with a unique code. Furthermore, the management server and ensures that all of the target devices are allocated unique access codes. Upon power-up, a target device connects to the management server to report that it is ready for operation, receives an access code, and can then indicate that it is ready for operation (e.g., by displaying a barcode and turning on the back-light of its display). The target device and management server may be configured to keep communicating at regular intervals (e.g., by polling). If communication is interrupted, the target device may be configured to disable the login mechanism (e.g., turning off the back-light of the display and/or removing the barcode from the display until communication is re-established).

While some of the preceding examples relate to barcodes, the disclosed techniques are in no way restricted to barcode-based implementations. For instance, a NFC reader can also be connected as an I/O peripheral either in place of or to complement a displayed barcode. In such scenarios, the user device can be held in proximity to the NFC reader to initiate the transfer of a unique identifying code (e.g., an HTTP string or some other unique identifying code) that in turn facilitates the authentication of the user device with the management server. From there, the user device can be used as described above to perform operations that display account balances and allow the operator of the user device to perform the above-described actions upon the linked target device.

In summary, the disclosed embodiments facilitate replacing physical aspects of redemption-style-games with a mobile user device. The disclosed techniques work with any target device that accepts physical currency or virtual payments, including (but not limited to) arcade games, casino machines, laundry machines, vending machines, parking meters. Furthermore, the disclosed techniques simplify managing the rewards that are output by some redemption-based target devices. Storing balances on a management server that can be accessed via user devices allows users to access such balances anywhere, and relieves the user frustration associated with physical media (no more stuck tickets/coins) and card-based approaches with limited mechanisms for checking balances.

Terminology

The various illustrative logical blocks and modules described in connection with the embodiments disclosed herein can be implemented or performed by a machine, such as a hardware processor or digital logic circuitry, which may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The user interfaces shown herein include one or more user interface controls that can be selected by a user, for example, using a browser or other application software. Thus, the user interface shown may be output for presentation by the application, which may optionally include a browser or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options. Although each of these user interfaces are shown implemented in a mobile device, the user interfaces or similar user interfaces can be output by any computing device, examples of which are described above. The user interfaces described herein may be graphical user interfaces generated electronically by the application.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating access to a target device, comprising:
presenting from the target device a unique code to a user device that is located in proximity to the target device, wherein the user device presents the unique code to a management server for the target device to gain access to the target device, wherein the management server links the user device and the target device, wherein the user device is associated with a user account on the management server, wherein the target device periodically receives unique codes from the management server, wherein the unique code is presented for only a specified time interval, wherein upon receiving an updated unique code from the management server the target device discards the unique code and instead presents the updated unique code to proximate user devices to ensure that only presently physically proximate user devices can access the target device;

receiving at the target device notification that the user device has been linked to the target device and account information for the user account;

displaying the account information for the user account on a display of the target device;

receiving at the target device notification from the management server that the user device has applied a credit to the target device; and initiating an operation on the target device that is associated with consuming the credit.

2. The computer-implemented method of claim 1, wherein presenting the unique code to the user device comprises:

displaying a unique barcode on a display for the target device;

wherein the user device scans and decodes the unique barcode using a camera to decode the unique code; and wherein the user device presents the unique code and authentication information to the management server to gain access to the target device.

3. The computer-implemented method of claim 2, wherein displaying the unique barcode further comprises displaying the unique barcode for a specified time interval.

4. The computer-implemented method of claim 1, wherein presenting the unique code to the user device comprises:

transmitting the unique code to the user device using near-field communication (NFC);

wherein the user device presents the unique code received via NFC and authentication information to the management server to gain access to the target device.

5. The computer-implemented method of claim 4, wherein transmitting the unique code further comprises:

receiving at the target device the unique code from the management server;

broadcasting the unique code for a specified time interval using NFC; and upon receiving a second unique code from the management server, discarding the first unique code and broadcasting the second unique code;

wherein periodically changing the code broadcast by the target device facilitates ensuring that only presently physically proximate user devices can access the target device.

6. The computer-implemented method of claim 1, wherein receiving notification that the user device has been linked to the target device comprises:

allowing the user device to apply credits to the target device;

displaying balance information associated with the user account on the display of the user device and on the display of the target device; and and directing an output associated with the operation on the target device to the user account.

7. The computer-implemented method of claim 6,
wherein the target device is a redemption game machine;
wherein consuming the credit comprises initiating game play on the redemption game machine; and
wherein the output is a reward that is won during game play that is credited to the user account.

8. The computer-implemented method of claim 7, wherein directing the output to the user account further comprises:

informing the management server of the reward that should be credited to the user account;

updating the display of the target device to reflect an updated reward balance for the user account; and updating the display of the user device to reflect the updated reward balance.

9. The computer-implemented method of claim 8,
wherein the management server monitors activity of the target device; and
wherein, upon detecting at least one of the output to the user account or a that a specified time interval has elapsed since the most recent activity on the target device, the management server is configured to unlink the user device and the target device.

10. The computer-implemented method of claim 9,
wherein the management server notifies the target device that the target device is no longer linked;
wherein the method further comprises notifying the management server that one or more credits that are associated with the user account are presently unused; and
wherein the management server credits the one or more credits to the user account when unlinking the target device and the user device.

11. The computer-implemented method of claim 1, wherein receiving notification that the user device has been linked to the target device comprises:

sending from the management server to the user device instructions detailing a user action that needs to be performed on the target device to link to the target device, receiving at the target device an indication that the user device is requesting access to the target device;

displaying on the display of the target device a message requesting confirmation of physical proximity to the target device via the user action; and upon confirming the user action being performed upon the target device within a given time interval, confirming the physical proximity of the user device and linking the user device with the target device.

12. The computer-implemented method of claim 11, wherein the user action comprises receiving a specific sequence of button presses event on the target device within a specified time interval of displaying the message to confirm the physical proximity of the user device and target device.

13. The computer-implemented method of claim 1,
wherein the user device is simultaneously linked to multiple target devices at the same time to enable multiple simultaneous operations on all of the multiple target devices using the user account;
wherein the user device displays a set of linked target devices; and
wherein the user device is configured to simultaneously apply credits to two or more of the linked target devices.

14. A computer-implemented method for facilitating access to a target device, comprising:

receiving on a user device a unique code from the target device, wherein the target device is located in proximity to the user device, wherein the target device periodically receives unique codes from the management server, wherein the unique code is presented for only a specified time interval, wherein upon receiving an updated unique code from the management server the target device discards the unique code and instead presents the updated unique code to proximate user devices to ensure that only presently physically proximate user devices can access the target device;

presenting the unique code and authentication information for a user account to a management server for the target device to gain access to the target device, wherein upon authenticating the user account the management server links the target device and the user device, wherein the management server sends user identification and account balance information to the target device and the user device, wherein the target device displays the received user identification and account balance information on a display of the target device;

displaying account balance information for the user account on the display of the user device;

receiving at the user device a request to apply a credit to the target device; and sending the request to apply the credit to the management server, wherein the management server subtracts the credit from the user account and notifies the target device of the applied credit, wherein the target device initiates an operation on the target device that is associated with consuming the credit.

15. A non-transitory computer-readable storage medium storing instructions that when executed by a computer cause the computer to perform a method for facilitating access to a target device, the method comprising:

presenting from the target device a unique code to a user device that is located in proximity to the target device, wherein the user device presents the unique code to a management server for the target device to gain access to the target device, wherein the management server links the user device and the target device, wherein the user device is associated with a user account on the management server, wherein the target device periodically receives unique codes from the management server, wherein the unique code is presented for only a specified time interval, wherein upon receiving an updated unique code from the management server the target device discards the unique code and instead presents the updated unique code to proximate user devices to ensure that only presently physically proximate user devices can access the target device;

receiving at the target device notification that the user device has been linked to the target device and account information for the user account, wherein the user device is associated with a user account;

displaying the account information for the user account on a display of the target device;

receiving at the target device notification from the management server that the user device has applied a credit to the target device; and initiating an operation on the target device that is associated with consuming the credit.

16. A computing device that that facilitates remote access from a user device, comprising:

a processing element;
a memory;
a network interface; and
a display;

wherein the processing element and memory are configured to present a unique code to a user device that is located in proximity to the computing device, wherein the user device presents the unique code to a management server for the computing device to gain access to the computing device, wherein the management server links the user device and the computing device, wherein the user device is associated with a user account on the management server, wherein the computing device periodically receives unique codes from the management server, wherein the unique code is presented for only a specified time interval, wherein upon receiving an updated unique code from the management server the computing device discards the unique code and instead presents the updated unique code to proximate user devices to ensure that only presently physically proximate user devices can access the computing device;

wherein the network interface is configured to receive notification that the user device has been linked to the computing device and account information for the user account;

wherein the display is configured to display the account information for the user account;

wherein the network interface is further configured to receive notification from the management server that the user device has applied a credit to the computing device; and wherein the processing element is configured to initiate an operation that is associated with consuming the credit.

17. The computer-implemented method of claim 13, wherein the user device sends a request to the management server to verify two or more target devices that the user device is presently linked to;

wherein the management server relays the verify request to all target devices that are presently linked to the user account; and wherein in response to the verify request, the linked target devices flash a display back-light and display the currently linked user's balance values.

18. The computer-implemented method of claim 17, wherein user account balances and user identification information is displayed on the user device; and wherein the account information for the user account is only displayed on a linked target device for a brief interval when a user explicitly initiates a verification request to ensure that linked target devices can be identified but do not continuously display potentially sensitive user information.

19. The computer-implemented method of claim 1, wherein the management server only permits the user device to link to one target device at a time; and wherein, upon determining that the user device was already linked to a previous target device, the management server unlinks the user device and the user account from the previous target device when linking the user device to the target device.

20. The computer-implemented method of claim 1, wherein the management server tracks a moving window of recent unique codes for each target device; and wherein the management server is configured to allow a recently expired unique code from a target machine to still be used for linking purposes for a specified time interval after the expired unique code has been discarded by the target device to ensure that slightly delayed login attempts from user devices can complete successfully.

* * * * *